United States Patent

Luckenbill

[11] 4,078,722
[45] Mar. 14, 1978

[54] RELIEF VALVE

[75] Inventor: Lawrence F. Luckenbill, Decatur, Ill.

[73] Assignee: A. W. Cash Valve Manufacturing Corporation, Decatur, Ill.

[21] Appl. No.: 736,379

[22] Filed: Oct. 28, 1976

[51] Int. Cl.$^2$ .............................................. F16K 17/36
[52] U.S. Cl. .................................. 236/92 C; 220/309; 267/169; 251/214; 137/542
[58] Field of Search ............... 236/92 C, 33; 137/471, 137/542, 543; 251/214; 267/169; 220/309; 29/173, 323

[56] References Cited

U.S. PATENT DOCUMENTS

| 174,821 | 3/1876 | Johnson | 220/309 X |
|---|---|---|---|
| 3,396,449 | 8/1968 | Brantner | 29/173 |
| 3,471,087 | 10/1969 | Caparone et al. | 137/505.41 X |
| 3,554,223 | 1/1971 | Shea | 137/539 |
| 3,662,949 | 5/1972 | McIntosh et al. | 236/92 C |

*Primary Examiner*—William E. Wayner
*Attorney, Agent, or Firm*—Wegner, Stellman, McCord, Wiles & Wood

[57] ABSTRACT

An improved relief valve of the type responsive to a predetermined thermal and/or pressure condition. The valve includes a valve body having an inlet, an outlet, an internal passage interconnecting the two, a valve seat about the passage and an opening coaxial with the valve seat, a poppet valve within the body, including a stem extending towards the opening and having a pressure responsive surface directed toward the inlet side of the valve seat, a closure disposed within the opening and having a central aperture slidably and sealingly receiving the stem, the closure being formed of a thin, relatively ductile material and having an outwardly extending lip frictionally captured by the body about the opening and sealingly engaging the body thereabout, the closure further including an annular convex ridge inwardly of the lip and within the body and a central pedestal directed oppositely of the ridge. A coil spring is interposed between the pedestal and the poppet valve for biasing the poppet valve against the valve seat. A thermally responsive actuator is carried by the valve body for opening the poppet valve in response to a predetermined thermal condition. A manual actuator is connected to the valve stem externally of the closure. The pressure setting of the valve is obtained by preloading the spring through deformation of the closure after the latter has been secured to the valve body.

5 Claims, 3 Drawing Figures

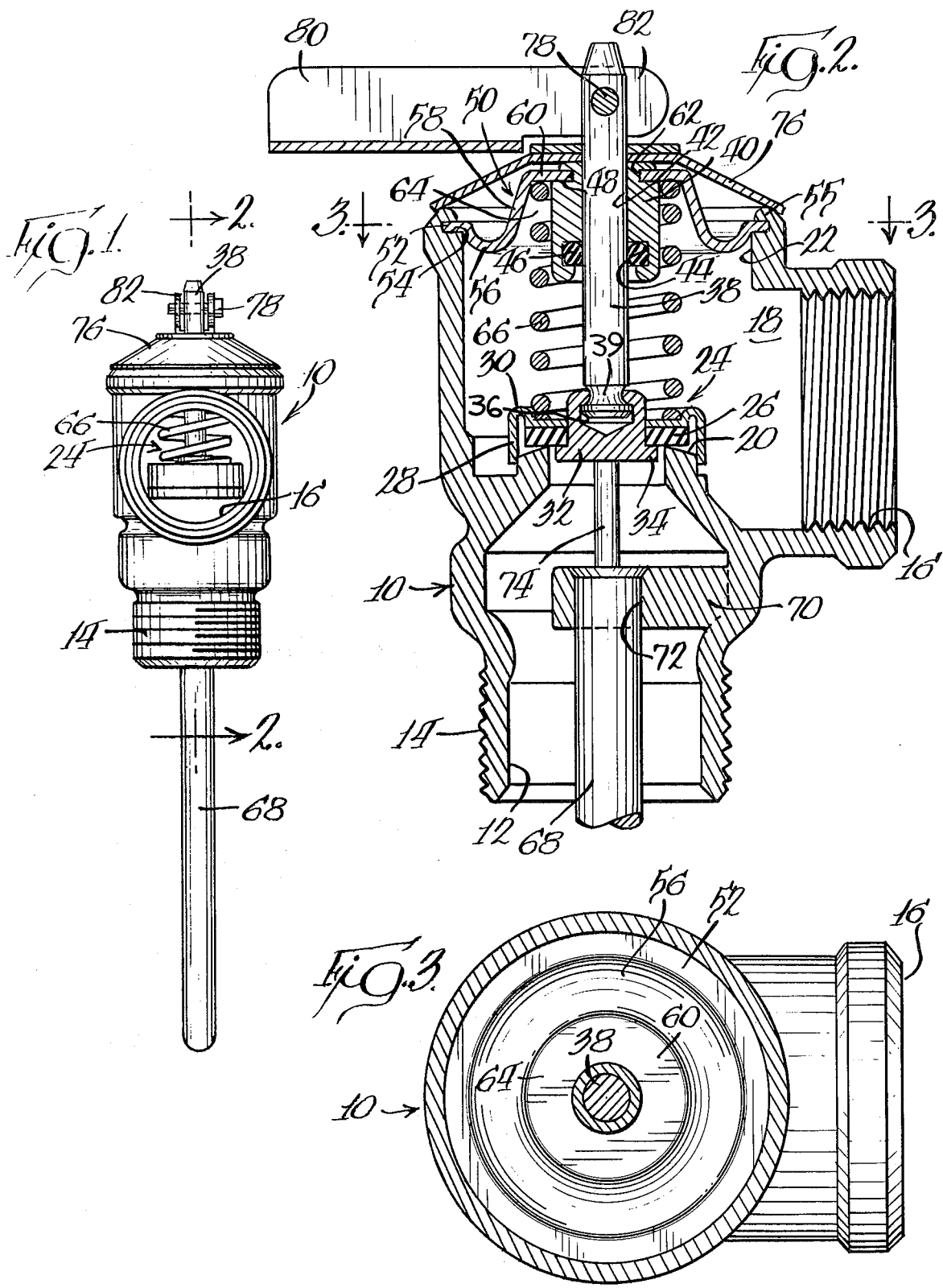

RELIEF VALVE

BACKGROUND OF THE INVENTION

This invention relates to relief valves. More specifically, it relates to relief valves of the type responsive to predetermined thermal and/or pressure conditions.

Prior art of possible relevance includes U.S. Pat. Nos. 3,396,449, issued Aug. 13, 1968 to Brantner; 3,471,087 issued Oct. 7, 1969 to Caparone et al; and 3,554,223 issued Jan. 12, 1971 to Shea.

Relief valves of the type providing relief in a fluid system in response to a predetermined pressure and/or thermal condition frequently employ a valve body having a valve seat which is normally closed by a poppet valve. In the usual case, the pressure setting of the valve is achieved by compressing a biasing spring for the valve to a desired degree, usually through the advancement of a nut or the like engaging one end of the spring through a bore. A significant disadvantage to this approach is economical, since the valve body typically is cast. It must be made of sufficient dimension so as to provide enough length in the bore to allow the desired adjustment. As a consequence, castings of which the valve bodies are formed are relatively large and, therefore, expensive.

Moreover, the threading of the bore is a costly manufacturing operation. In addition, typically some sort of seal must be provided to seal the interface of the threaded adjustment nut and the threaded bore, further increasing the cost. And, of course, with the large number of parts required, assembly labor expenses are commensurately increased.

In order to overcome these disadvantages, certain prior art constructions employ retainers for biasing the springs which are self-locking within a smooth bore in the body, usually by providing a sharp edge at some location on the retainer which bites into the sides of the bore. In the usual case, such sharp edges are structured so that the retainer cannot be easily removed from the bore. However, in such constructions, the retainer can be further advanced into the bore, thereby compressing the spring further and raising the pressure setting of the valve. Such movement of the retainer can occur accidentally due to jolts of the valve while in transit, or can occur through negligence on the part of the installer of the valve or the user of the valve.

In such a case, the pressure setting of the valve can be increased sufficiently so that it will not relieve thermal or pressure stresses in the system in which it is used at the desired thermal or pressure condition, possibly resulting in grave overloading of the system and rupture of parts thereof.

SUMMARY OF THE INVENTION

It is the principal object of the invention to provide a new and improved thermal and pressure responsive relief valve. More specifically, it is an object of the invention to provide such a valve wherein material and fabrication expense are minimized and yet one wherein the pressure setting cannot be accidentally or negligently altered.

An exemplary embodiment of the invention achieves the foregoing objects in a construction including a valve body having an inlet, an outlet, an internal passage interconnecting the inlet and outlet, a valve seat within the body and about the passage, and an opening generally coaxial with the valve seat. A poppet valve is disposed within the body and is normally closed against the seat. The poppet valve includes a stem extending towards the opening and a pressure responsive surface directed toward the inlet side of the valve seat. A closure is disposed within the opening and has a central aperture slidably and sealingly engaging the stem. The closure is formed of a thin, relatively ductile material and has an outwardly extending lip frictionally captured by the body about the opening. The lip also sealingly engages the body about the opening. The closure member includes an annular, convex ridge inwardly of the lip and within the body as well as a central pedestal directed oppositely from the ridge. A coil spring is interposed between the pedestal and the poppet valve for biasing the poppet valve against the valve seat. A thermally responsive actuator is carried by the valve body and is operatively associated with the poppet valve for opening the poppet valve in response to a predetermined thermal condition. A manual actuator is also connected to the valve stem externally of the closure. The pressure setting of the valve is obtained, after assembly of the components as mentioned, by deforming the closure member a predetermined amount to thereby compress the spring to a desired degree to provide the desired pressure setting. The aforementioned configuration of the closure member allows such a deformation without pulling the lip thereof out of frictional and sealing engagement with the body.

In a preferred embodiment, the pedestal is frustoconical and the valve body is swaged over the lip.

In a highly preferred embodiment, a guide sleeve is secured to the closure within the aperture and slidably and sealingly receives the valve stem. The sleeve and the interior of the pedestal define an annular space which receives one end of the coil spring to provide a guide for the same during assembly.

In a highly preferred embodiment, a valve stem receiving bore is located in the sleeve and there is provided an annular, inwardly opening groove about the bore which receives a sealing element which sealingly engages the valve stem.

In a highly preferred embodiment, the closure is stamped from a thin sheet of metal selected from the group consisting essentially of brass, steel, aluminum, and alloys thereof.

Depending upon the degree of corrosion resistance and the actual material used, the sheet may be coated with a corrosion resistant material.

Other objects and advantages will become apparent from the following specification taken in connection with the accompanying drawings.

DESCRIPTION OF THE DRAWINGS

FIG. 1 is an elevational view of a relief valve made according to the invention;

FIG. 2 is an enlarged, fragmentary, sectional view taken approximately along the line 2—2 of FIG. 1; and FIG. 3 is a horizontal sectional taken approximately along the line 3—3 of FIG. 2.

DESCRIPTION OF THE PREFERRED EMBODIMENT

An exemplary embodiment of a relief valve made according to the invention is illustrated in the drawings and is seen to include a body, generally designated 10, which typically will be formed of cast brass or the like. As best seen in FIG. 2, the body 10 includes an inlet 12 surrounded by exterior threads 14 by which the body 10 can be attached to a fluid system. Extending from one side of the body 10 is an outlet 16 which is internally threaded as illustrated for connection to a pipe or the like into which fluid to be discharged from the system, upon opening of the valve, may be directed.

The interior of the body 10 includes a passage 18 interconnecting the inlet 12 and outlet 16 and the passage 18 is provided with an annular valve seat 20 located between the inlet 12 and the outlet 16. The body 10 also includes an opening 22 located oppositely from and aligned with the inlet 12 such that the outlet 16 is in communication with the passage 18 between the inlet 12 and the opening 22.

A poppet valve, generally designated 24, is disposed within the body to normally close against the valve seat 20. The poppet valve 24 includes an elastomeric washer 26 which sealingly engages the seat 20 and which is backed by an inverted, generally cup-shaped member 28 having an annular, raised rib 30 on its upper surface.

A retainer 32 extends through central apertures in the washer 26 and the cup-shaped member 28 and includes a peripheral flange 34 whereby the washer 26 is held tightly against the bottom of the cup-shaped member 28. The upper end of the retainer 32 includes a central, downwardly extending bore 36 which receives the lower end of a valve stem 38. The valve stem 38, at its lower end, includes a radially outwardly opening groove 39 into which the upper end of the retainer 32 is deformed to secure the two together.

It will be observed that the opening 22 and the inlet 12 are generally coaxial with each other and with the valve seat 20 such that the valve stem 38 extends along the axis of the opening 22 through the same.

A guide sleeve 40 includes a central bore 42 which slidably receives the valve stem 38. The lower end of the bore 42 is provided with a radially inwardly opening, annular groove 44 for receipt of a sealing element 46 in the form of an O-ring or the like. The upper end of the sleeve 40 includes a radially outwardly opening, annular groove 48 whereby the sleeve 40 receives, and is secured to, a closure 50 for the opening 22.

The closure 50 is formed, as by stamping, from a thin sheet of a relatively ductile material selected from the group consisting of brass, steel (including stainless steel), aluminum and alloys thereof. In general, when brass or stainless steel are employed in forming the closure member 50, no corrosion protection is required. However, in some uses, where nonstainless steel or aluminum are used in forming the closure 50, the underside of the same may be coated with a corrosion resistant material which may be, but need not be, a corrosion resistant metal.

The closure 50 includes an outwardly extending lip 52 which is abutted against a shoulder 54 on the body 10 about the opening 22. A portion 55 of the body is then swaged over the lip 52 to secure the closure 50 to the body as well as to establish a seal between the lip 52 and the body.

Radially inwardly of the lip 50 is an annular, convex ridge 56 which extends into the body 10. The ridge 56 is arcuate in cross section, as illustrated in FIG. 2, for purposes to be seen. The central portion of the closure 50 includes a pedestal 58, preferably frusto-conical in nature, which extends oppositely from the ridge 56 and which includes a flat top 60 with a central aperture 62. That portion of the top 60 immediately adjacent the aperture 62 is received in the groove 48 to establish a seal between the closure 50 and the sleeve 40. Typically, when the sleeve 40 is in the form of a blank prior to assembly, the groove 48 will not be present so as to allow assembly of the sleeve 40 to the closure 50. Thereafter, the upper end of the sleeve 40 may be deformed over the top 60 of the closure 50 to establish the seal and firmly secure the sleeve 40 to the closure 50 and form the groove 48.

It will be noted that the interior wall of the frustoconical pedestal 58 is spaced from the exterior of the sleeve 40 to define an annular area 64.

A coil spring 66 is disposed within the body and interposed between the closure 50 and the poppet valve 24. One end of the spring 66 is received in the annular space 64, the latter serving to receive the spring and locate the same to expedite assembly. The opposite end of the spring 66 abuts the poppet valve 24 radially inwardly of the ridge 30 on the cup-shaped member 28, the ridge 30 also serving to locate the spring 66 in the desired fashion.

The valve also includes a probe 68 mounted on the valve body 10 by means of a lug 70 and a bore 72 therein within the passage 18. The probe 68 includes a thermally responsive actuator of any desired construction which actuator includes a plunger 74 which abuts the underside of the retainer 32. Upon the sensing of a thermal condition in excess of a predetermined amount, the actuator will cause the plunger 74 to move upwardly to open the poppet valve 24 against the bias of the spring 66.

It will also be appreciated that the underside of the washer 26 and the retainer 32 define a pressure responsive surface facing the inlet 22 so that upon the existance of a predetermined pressure condition within the inlet 12, such pressure as applied against the underside of the poppet valve 24 will cause the same to open against the bias of the spring 66.

The valve further includes a frusto-conical cover 76 through which the valve stem 38 extends. Exteriorly of the cover 76, the valve stem 38 mounts a pivot pin 78 which is connected to a manual actuator 80. When the actuator 80 is in the position shown, operation of the valve will be purely automatic according to pressure and thermal conditions. When, however, it is desired to open the valve for any reason, the actuator 80 may be pivoted clockwise as viewed in FIG. 2 through 90° at which time a cam surface 82 thereon will engage the upper surface of the cover 76 to cam the actuator 80 upwardly. By reason of the pinned connection to the valve stem 38 the valve stem 38 will be moved upwardly to thereby open the valve.

A highly significant aspect of the present invention is the construction of the closure 50 of a relatively ductile material as mentioned previously, as well as the previously described geometry of the same.

During the assembly process, and prior to application of the cover 76 and the handle 80, but after the affixing of the closure member 50 to the valve body by swaging the portion 55 of the body over the lip 52 of the closure, the pressure setting of the valve is made by placing a downward force on the upper surface of the closure 50 sufficient to deform the same and compress the spring 66 to a desired degree.

In general, the desired deforming force will be applied by a die configured to generally mate with the sides of the frusto-conical pedestal 58 and the radially inner half of the concave surface of the ridge 56. During the application of such a deforming pressure, the downward force at the radially inner edge of each lip 52 will be effectively resisted by the radially inner portion of the shoulder 54, while the forces tending to move the radially outer edge of the lip 52 upwardly will be effectively resisted by the swaged portion 55 due to a tendency of the radially outer portion of the ridge 56 to "roll" along the interior of the opening 22. As a result, the lip 52 will be firmly frictionally held in place and the seal between the lip 52 and the body 10 will not be broken. Moreover, because the forces act primarily in a vertical direction as viewed in FIG. 2, there is no tendency for the lip 52 to be pulled radially inwardly to weaken the connection and/or the seal between the same and the body 10.

It will also be observed that the unique assembly of the sleeve 40 to the closure 50 strengthens the top 60 of the pedestal 58 in the vicinity where spring pressure is applied to prevent undesirable deflections due to the spring loading. Similarly, internal forces within the valve body 10 as, for example, when the valve is open and there is considerable back pressure at the outlet 10, will not cause undersirable expulsion of the closure 50. The convex configuration of the ridge 56 results in the total of the forces being applied thereagainst having a principally vertical component with the result that pressure loads on the outer part of the closure 50 are all transmitted directly to the swaged portion 55 without deflection.

I claim:

1. A relief valve responsive to a predetermined thermal and/or pressure condition comprising:
    a valve body having an inlet, an outlet, an internal passage interconnecting said inlet and outlet, a valve seat within said body and about said passage, and an opening generally coaxial with said valve seat;
    a poppet valve within said body and normally closed against said seat, said poppet valve including a stem extending toward said opening and a pressure responsive surface directed toward the inlet side of said valve seat;
    a closure disposed within said opening and having a central aperture slidably and sealingly receiving said stem, said closure being formed of a thin, relatively ductile material and having an outwardly extending lip frictionally captured by said body about said opening and sealingly engaging said body about said opening, an annular convex ridge, arcuate in cross section, inwardly of said lip and within said body with its outer portion in contact with the interior of said opening, and a central pedestal directed oppositely of said ridge;
    a coil spring interposed between said pedestal and said poppet valve for biasing, in a predetermined amount, said poppet valve against said valve seat;
    a thermally responsive actuator carried by said valve body and operatively associated with said poppet valve for opening said poppet valve in response to a predetermined thermal condition; and
    a manual actuator connected to said valve stem externally of said closure.

2. The relief valve of claim 1 wherein said valve body is cast and is swaged over said lip.

3. A relief valve responsive to a predetermined thermal and/or pressure condition comprising:
    a valve body having an inlet, an outlet, an internal passage interconnecting said inlet and outlet, a valve seat within said body and about said passage, and an opening generally coaxial with said valve seat;
    a poppet valve within said body and normally closed against said seat, said poppet valve including a stem extending toward said opening and a pressure responsive surface directed toward the inlet side of said valve seat;
    a closure disposed within said opening and having a central aperture and otherwise being imperforate, said closure being formed of a thin, relatively ductile material and having an outwardly extending lip fricionally captured by said body about said opening and sealingly engaging said body about said opening, an annular convex ridge inwardly of said lip and within said body, and a central, frusto-conical pedestal directed oppositely from said ridge, said aperture being disposed in the top of said pedestal;
    a guide sleeve secured to said closure within said aperture and slidably and sealingly receiving said valve stem;
    said sleeve and the interior of said pedestal defining an annular space;
    a coil spring interposed between said poppet valve and said pedestal and having one end received in said annular space and its opposite end abutting said poppet valve oppositely of said valve seat to bias said poppet valve toward said valve seat;
    a thermally responsive actuator carried by said valve body and operatively associated with said poppet valve for opening said poppet valve in response to a predetermined thermal condition; and
    a manual actuator connected to said valve stem externally of said closure.

4. The poppet relief valve of claim 3 wherein said valve stem is slidably received in a bore in said sleeve, and further including a radially inwardly opening groove in said sleeve about said bore, and an annular seal in said groove and engaging said valve stem.

5. A relief valve responsive to a predetermined thermal and/or pressure condition comprising:
    a cast valve body having an inlet, an outlet, an internal passage interconnecting said inlet and outlet, a valve seat within said body and about said passage, and an opening generally coaxial with said valve seat;
    a poppet valve within said body and normally closed against said seat, said poppet valve including a stem extending toward said opening and a pressure responsive surface directed toward the inlet side of said valve seat;
    a closure disposed within said opening and having a central aperture and otherwise being imperforate, said closure being formed of a thin, relatively ductile material selected from the group consisting essentially of brass, steel, aluminum and alloys thereof, and having an outwardly extending lip frictionally captured by a portion of said body about said opening swaged over said lip and thereby sealingly engaging said body about said opening, an annular convex ridge, arcuate in cross section, inwardly of said lip and within said body with its outer portion in contact with the interior of said opening, and a central, frusto-conical pedestal directed oppositely from said ridge, said aperture being disposed in the top of said pedestal;
    a guide sleeve secured to said closure within said aperture and having a bore slidably receiving said valve stem and a radially inwardly opening groove about said bore receiving an annular seal which in turn sealingly engages aid stem;

said sleeve and the interior of said pedestal defining an annular space;

a coil spring interposed between said poppet valve and said pedestal and having one end received in said annular space and its opposite end abutting said poppet valve oppositely of said valve seat to bias said poppet valve toward said valve seat;

a thermally responsive actuator carried by said valve body and operatively associated with said poppet valve for opening said poppet valve in response to a predetermined thermal condition; and a manual actuator connected to said valve stem externally of said closure.

* * * * *